Aug. 7, 1923.  
E. W. SHIMIN  
DRILL BIT  
Filed Jan. 17, 1923  
1,463,848
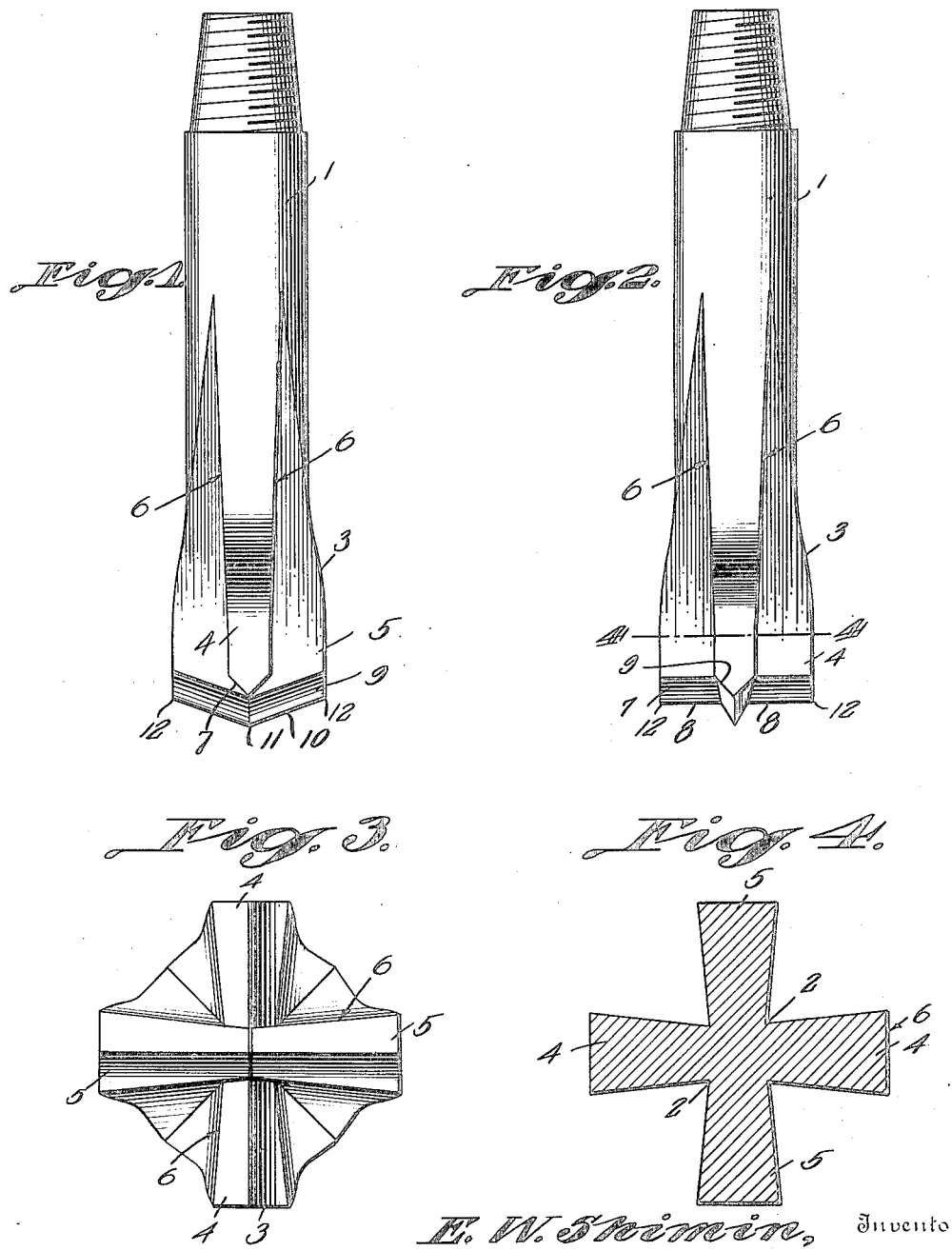

Patented Aug. 7, 1923.

1,463,848

UNITED STATES PATENT OFFICE.

EDWARD W. SHIMIN, OF THERMOPOLIS, WYOMING.

DRILL BIT.

Application filed January 17, 1923. Serial No. 613,289.

*To all whom it may concern:*

Be it known that I, EDWARD W. SHIMIN, a citizen of the United States, residing at Thermopolis, in the county of Hot Springs and State of Wyoming, have invented a new and useful Drill Bit, of which the following is a specification.

This invention aims to provide a drill bit which is so constructed that the central portion of the hole will be cut in advance of the reaming of the hole, the result being a drill bit of peculiar efficiency, and one which can be kept in repair cheaply, the bit being adapted to bore a straight hole without lateral deflection.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention; Figure 2 is an elevation wherein the device is viewed at right angles to the showing of Figure 1; Figure 3 is an end elevation; Figure 4 is a cross section on the line 4—4 of Figure 2.

The drill bit forming the subject matter of this application comprises a shank 1 having a cruciform head 2 which, as indicated at 3, is wider than the shank 1. The shank 1 is made of a first wing 4 and a second wing 5, the wings intersecting, and being disposed at right angles to each other. The side surfaces 6 of each wing converge toward the working end of the bit, the first wing 4 being beveled as at 7, at its working end, to form cutting edges 8 disposed at right angles to the axis of the bit, the second wing 5 being beveled as at 9, at its working end, to form cutting edges 10 disposed in advance of the cutting edges 8 of the first wing 4. The edges 10 converge to form a point 11 located in the axis of the bit, the angles 12 formed at the outer extremities of the cutting edges 8 and 10 constituting reamers.

The general construction of the bit is such that, owing to the convergence of the edges 10 to form the point 11, the hole will be cut gradually in advance of the reaming operation which takes place at the angles denoted by the numeral 12.

What is claimed is:—

A drill bit comprising a shank having a cruciform head which is wider than the shank, the head being made up of first and second intersecting wings disposed at right angles to each other, the side surfaces of each wing converging toward the working end of the bit, the first wing being beveled at its working end to form cutting edges disposed at right angles to the axis of the bit, the second wing being beveled at its working end to form cutting edges disposed in advance of the cutting edges of the first wing and converging to form a point located in the axis of the bit, the angles formed at the outer extremities of the cutting edges of both wings constituting reamers.

In testimony that I claim the foregoing as my own, I have hereto affixed my signature in the presence of two witnesses.

EDWARD W. SHIMIN.

Witnesses:
 CURTIS L. SWAMMS,
 A. L. DUHIG.